United States Patent [19]

Becker

[11] 4,414,188
[45] Nov. 8, 1983

[54] PRODUCTION OF ZIRCONIUM DIBORIDE POWDER IN A MOLTEN SALT BATH

[75] Inventor: Aaron J. Becker, Monroeville, Pa.

[73] Assignee: Aluminum Company of America, Pittsburgh, Pa.

[21] Appl. No.: 371,234

[22] Filed: Apr. 23, 1982

[51] Int. Cl.³ .............................................. C01B 35/04
[52] U.S. Cl. ...................................... 423/297; 501/96
[58] Field of Search ........................... 423/297; 501/96

[56] References Cited

U.S. PATENT DOCUMENTS

| | | | |
|---|---|---|---|
| 3,258,316 | 6/1966 | Tepper et al. | 423/297 |
| 3,520,656 | 7/1970 | Meadows et al. | 23/208 |
| 3,692,479 | 9/1972 | Meadows et al. | 423/291 |
| 4,285,724 | 8/1981 | Becker et al. | 75/84.4 |

FOREIGN PATENT DOCUMENTS 901402 7/1962 United Kingdom.

Primary Examiner—Gary P. Straub
Assistant Examiner—Jackson Leeds
Attorney, Agent, or Firm—Glenn E. Klepac

[57] ABSTRACT

A process for production of $ZrB_2$ powder in a molten salt bath by reaction of $ZrCl_4$ or $ZrCl_2$ with a boron halide and Al or Mg. In a preferred embodiment the salt bath comprises $ZrCl_4$, KCl and NaCl maintained at a temperature of about 540° to 660° C. and solid Al powder is reacted with $ZrCl_4$ and $BCl_3$. The $ZrB_2$ powder produced in a particularly preferred embodiment has a median particle size of about 1.1 microns, is equiaxed, and has only a single phase.

9 Claims, 6 Drawing Figures

PRODUCTION OF ZIRCONIUM DIBORIDE POWDER IN A MOLTEN SALT BATH

BACKGROUND OF THE INVENTION

This invention relates to a process for production of $ZrB_2$ powder that is shaped into sintered refractory hard metal (RHM) bodies for use as cathode bodies in the aluminum industry.

Cathode bodies produced from available RHM powders have had unacceptably short service lifetimes because of intrinsic flaws traceable to carbon and oxygen impurities, phase inhomogeneity, microcracks and residual stresses. Impurities and phase inhomogeneity are carried into the cathode bodies from the RHM powder. Carbon and oxygen impurities are traceable to the raw materials while phase inhomogeneity arises from inadequate control of the powder production process. Microcracks and residual stresses form in RHM bodies during the densification process because of pore coarsening and/or shape change and lack of grain boundary pinning at the pores. Therefore, microcracks and residual stresses in finished parts can be minimized by powders that can give high green density parts, contain no foreign particles in the green state and have a narrow particle density range in the green state. Particles which can fulfill these requirements are those which are made from raw materials containing no oxygen or carbon; are processed with close temperature and composition controls; contain no foreign material; have a narrow particle size distribution with a very fine average particle size; and are equiaxed.

Processes for producing $ZrB_2$ powder in a molten salt bath have been described in the prior art. However, each of the known prior art molten salt bath processes suffers from one or more serious disadvantages making it less than entirely suitable for its intended purpose.

For example, British Pat. No. 901,402 published July 18, 1962 includes an Example 13 wherein $ZrB_2$ powder is formed by reaction of $ZrO_2$ powder with Ca and $CaB_4O_7$ in a molten medium comprising anhydrous $CaCl_2$. The molten reactants are contained in a reactor maintained at a temperature of 870°-910° C. The product recovered included 94% $ZrB_2$ powder having an average particle size of 20-35 millimicrons.

Some related processes for formation of RHM powders in a molten salt bath are disclosed in Meadows et al U.S. Pat. Nos. 3,520,656 and 3,692,479. Example 19 of the latter patent is a process for the preparation of a solid solution of $TiB_2$ and $ZrB_2$. Raw materials used are a mixture of $TiO_2$, $ZrO_2$, $CaB_4O_7$ and Ca reacted together in a $CaCl_2$ melt maintained at a temperature of 950°-1000° C. The resulting product is a solid solution of $TiB_2$ and $ZrB_2$ having a crystal size of about 40 millimicrons and 94% purity. Neither oxygen levels nor phase homogeneity was reported, and particle symmetry information is lacking.

Powders produced in reactions described in the above-mentioned patents suffer from having such fine particle size that, if pure, they are highly pyrophoric and are nearly impossible to handle in air without being at least partially oxidized. Without information on particle morphology, it is almost impossible to predict the suitability of such powders for end use as cathode bodies. In addition, because these diboride powders are made from metal oxide starting materials, they fall short of the high purity levels needed for successful production of RHM cathode bodies having utility in the aluminum industry.

SUMMARY OF THE INVENTION

In accordance with the present invention, $ZrB_2$ powder is formed by reaction of $ZrCl_4$ or $ZrCl_2$ with a boron halide and Al or Mg in a molten salt bath. The bath comprises $ZrCl_4$ or $ZrCl_2$ together with at least one other salt selected from the group consisting of halides of K, Na, Li, Ca and Mg, and mixtures thereof.

In a preferred embodiment, the molten salt bath comprises $ZrCl_4$ and equimolar quantities of KCl and NaCl. Gaseous $ZrCl_4$ and $BCl_3$ are fed to the bath where they react with Al in solid particulate form. A preferred operating range is about 540°-660° C. with optimum bath temperature being about 650° C.

The resulting $ZrB_2$ powder has a median particle size in the range of about 0.5 to 5 microns with a range of about 0.7 to 2 microns being preferred. A particularly preferred powder has a median particle size of about 1.1 microns with over 90 wt% less than 4 microns and less than 10 wt% below 0.3 microns. Practically all of the powder has a particle size in the range of about 0.2 to 6 microns. This powder is equiaxed, low in oxygen and carbon content and comprises a single homogeneous $ZrB_2$ phase.

It is a principal object of the present invention to provide a process for production of $ZrB_2$ powder in a molten salt bath, wherein the $ZrB_2$ powder is suitable for making RHM cathode bodies to be used in the aluminum industry.

It is a related object of the present invention to provide a process for production of $ZrB_2$ powder in a molten salt bath, wherein the powder has an average particle size of about 0.5 to 5 microns. A preferred average size is about 1.1 microns.

It is a further object of the present invention to provide a process for production of $ZrB_2$ powder in a molten salt bath wherein the resulting powder has low oxygen and carbon content and comprises a single, homogeneous phase.

Additional objects and advantages of the present invention will be apparent to persons skilled in the art from the following detailed description.

DETAILED DESCRIPTION OF A PREFERRED EMBODIMENT

Figure 1:
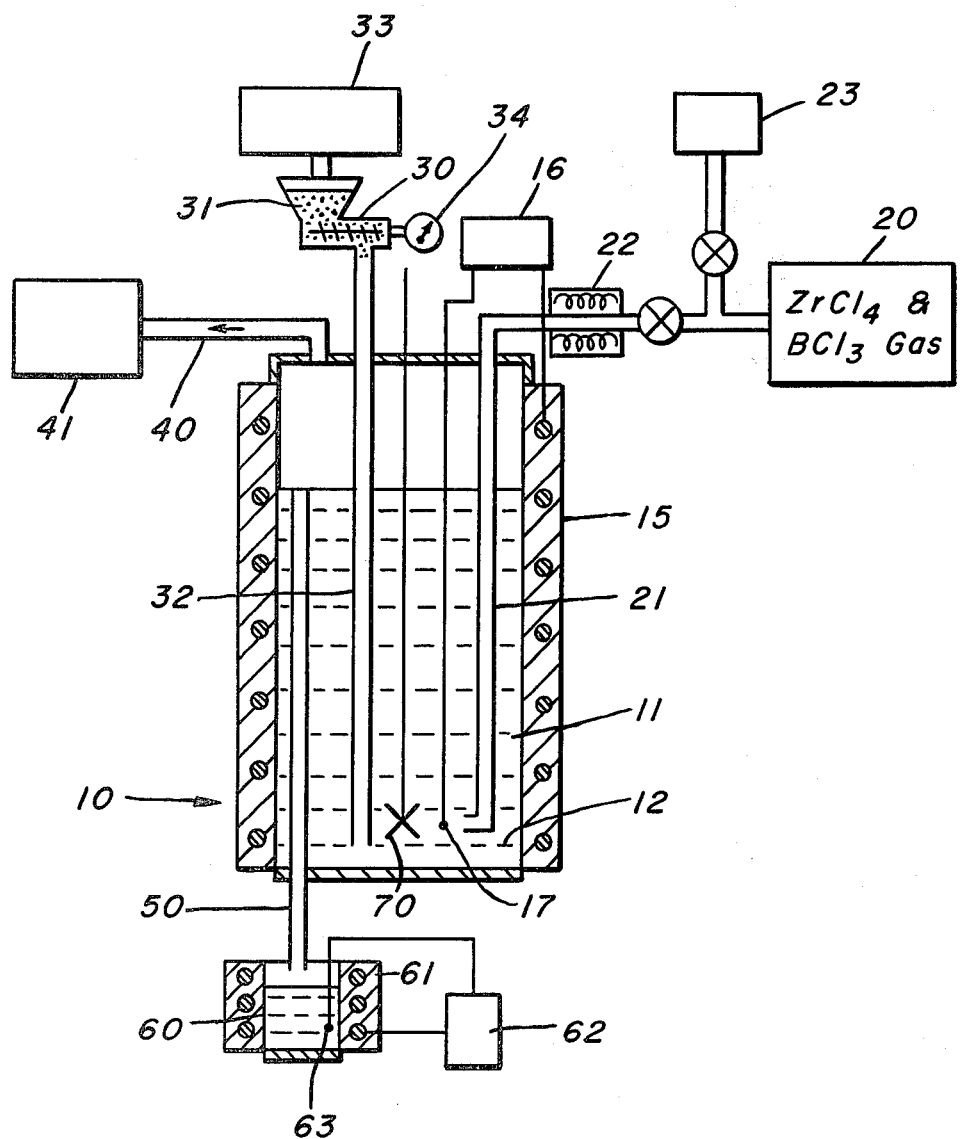
FIG. 1 is a schematic illustration of an apparatus for production of $ZrB_2$ powder in a molten salt bath in accordance with my invention.

There is shown in FIG. 1 a schematic illustration of an apparatus for production of $ZrB_2$ powder in accordance with the process of the invention. A centrally located reaction vessel 10 defines a generally cylindrical reaction chamber 11 that is lined by nickel. The chamber 11 is loaded with a molten salt bath 12 in which the process of the invention is carried out.

The reaction vessel 10 is heated by a furnace 15. Temperature is maintained within precise limits by a temperature controller 16 linked to a thermocouple 17 located inside the reaction vessel 10.

In accordance with the invention, gaseous reactants are contained outside the chamber 11 in a gas tank 20. A gas dispensing line or tube 21 carries the gaseous reactants from the tank 20 into the molten salt bath 12. A heater 22 adjacent the dispensing line 21 prevents condensation of reactants. The dispensing line 21 is purged by argon gas from a reservoir 23 connected to the line 21.

A screw feeder 30 located above the reaction vessel 10 holds solid Al powder 31. The powder 31 is carried to the salt bath 12 through a solid dispensing tube 32. The screw feeder 30 and dispensing tube 32 are purged by argon gas maintained in a gas tank 33 connected to the screw feeder 30. A pressure gauge 34 also connected to the screw feeder 30 maintains argon gas pressure in the feeder 30 and tube 32 within preselected limits.

A gas outlet tube 40 vents gas from the chamber 11 through a top opening in the reactor 10. Vented gas is carried to a gas condenser 41 where it is collected for reuse or disposal.

Solid $ZrB_2$ powder formed in the salt bath 12 is removed from the chamber 11 through a spillover tube or pipe 50 having an upper opening adjacent the top surface of the salt bath 12. The spillover tube 50 decants a mixture of $ZrB_2$ powder and the bath into a heated receiving tank 60. A furnace 61 heats the tank 60, with temperature being maintained constant by a thermostat 62 linked to a thermocouple 63 inside the tank 60. The receiving tank 60 is periodically removed from its connection with the spillover tube 50 and solid $ZrB_2$ is removed by siphoning or pouring.

A rotating, electrically operated stirrer 70 continuously agitates the molten salt bath 12. Agitation enhances reaction efficiency and promotes uniformity of particle size in $ZrB_2$ powder formed by the process of the invention.

The molten salt bath 12 comprises $ZrCl_4$ or $ZrCl_2$ and at least one other salt selected from the group consisting of halides of K, Na, Li, Ca, and Mg, and mixtures of such salts. A preferred bath composition is about 22 mole % $ZrCl_4$, 39 mole % KCl and 39 mole % NaCl. Some other suitable salts that may be used in the bath include LiF, LiCl, NaF, NaBr, KF, KBr, $CaF_2$, $CaCl_2$, $CaBr_2$, $MgF_2$, $MgCl_2$, and $MgBr_2$. When the bath comprises KCl and NaCl, an equimolar mixture of such salts is preferred. In a salt bath comprising $ZrCl_4$, NaCl and KCl, the concentration of $ZrCl_4$ may vary from about 2 mole % to 90 mole %. Concentrations of $ZrCl_4$ in the range of about 4 to 40 mole % are preferred.

Suitable boron halides that may be reacted with $ZrCl_4$ and Al in the molten salt bath to form $ZrB_2$ include $BF_3$, $BCl_3$ and $BBr_3$. $BCl_3$ is preferred because it is readily available in gaseous form at room temperature.

Solid Mg powder may be used instead of Al powder as a reducing agent. However, powdered Al is preferred because it is less costly than Mg.

The process of the invention proceeds according to the reaction:

$$3ZrCl_4 + 6BCl_3 + 10Al \rightarrow 3ZrB_2 + 10AlCl_3.$$

$ZrCl_4$ and $BCl_3$ are supplied to the reaction chamber 11 in gaseous form through the gas tube 21. Mixtures of $ZrCl_4$ and $BCl_3$ comprising 2 moles of $BCl_3$ per mole of $ZrCl_4$ are preferred.

Precise temperature and bath composition limits have not been verified experimentally. However, reaction temperatures in the range of about 540°–660° C. are preferred with an optimum reaction temperature being about 650° C. A reaction performed in a molten salt bath comprising 22 mole % $ZrCl_4$, 39 mole % KCl and 39 mole % NaCl at 650° C. produced $ZrB_2$ powder having an average particle size of about 1.1 microns. Average particle sizes in the range of about 0.7 to 2.0 microns are preferred.

Because no oxides are used in performing the process of the invention, oxygen content of the $ZrB_2$ powder will be significantly lower than in the prior art processes based upon reactions of zirconia in a molten salt bath. The $ZrB_2$ powder also has a negligible carbon content.

Figure 2:
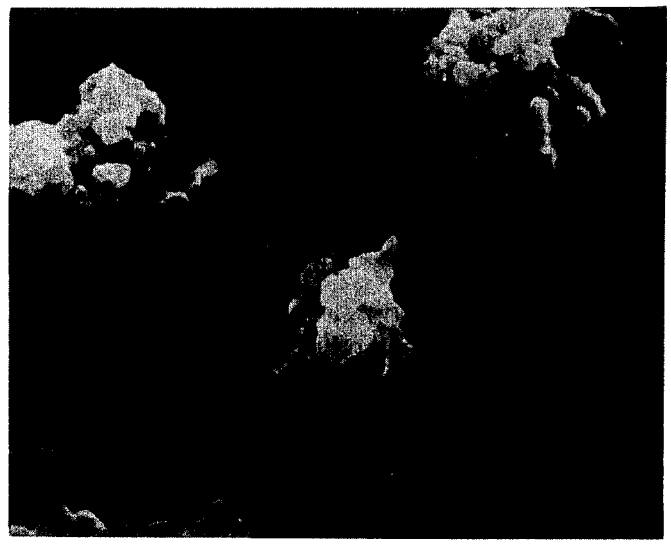
FIGS. 2 and 3 are scanning electron microphotographs showing the morphology of $ZrB_2$ powder made by the process of the invention.
Figure 3:

The morphology of $ZrB_2$ powder made in accordance with my invention is shown in FIGS. 2 and 3. These are electron microphotographs of gold coated powder. The longer white line in each photograph corresponds to a distance of one micron.

The powder shown in FIGS. 2 and 3 has a density of about 5.64 g/cm$^3$. The powder particles are equiaxed and are of a generally spheroidal shape, presenting a generally lobate curvilinear external contour. The particles are characterized by a marked absence of planar exterior surfaces and sharp protuberant angles normally accompanying fracture planes or the like.

Figure 4:
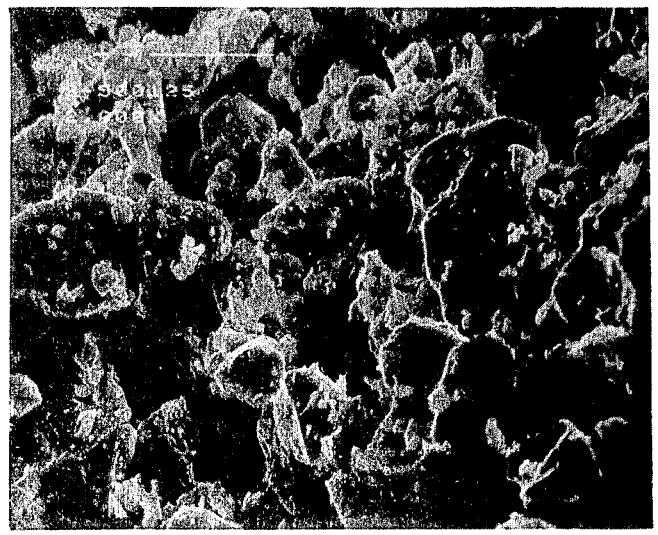
FIGS. 4 and 5 are scanning electron microphotographs showing the morphology of a prior art $ZrB_2$ powder.
Figure 5:
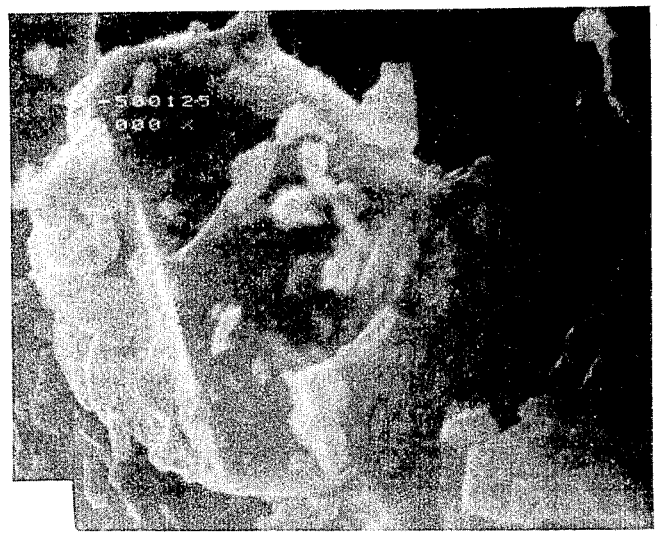

FIG. 4 is an electron microphotograph having a magnification factor of 2000X, and FIG. 5 is an electron microphotograph having a magnification factor of 10,000X, both showing commercially available milled $ZrB_2$ powder. A comparison of FIGS. 4 and 5 with FIGS. 2 and 3 reveals substantial differences between the commercial $ZrB_2$ powder and powder produced in accordance with the present invention. The commercial powder exhibits many irregular edges and fracture planes that are generally absent in FIGS. 2 and 3. Further, the commercial $ZrB_2$ powder has a wider distribution of particle sizes because there are many more ultrafine fragments shown in FIGS. 4 and 5 than in FIGS. 2 and 3.

These characteristics of $ZrB_2$ powder made in accordance with the present invention will avoid formation of agglomerates when the powder is compressed into RHM parts. In addition, this powder will produce RHM parts having more uniform distribution of pores and particles and higher green density than RHM parts made with milled powder.

Figure 6:
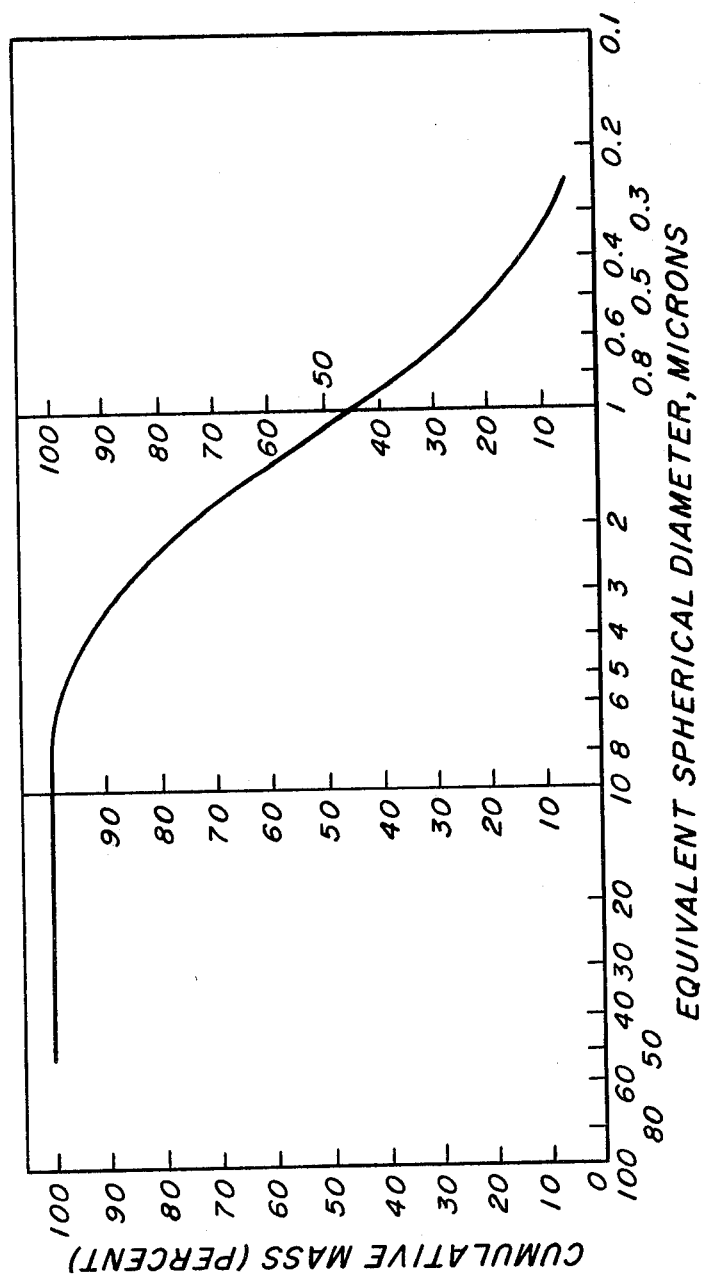
FIG. 6 is a graph showing particle size distribution of $ZrB_2$ powder made in accordance with a preferred process of the invention.

FIG. 6 is a graph, showing particle size distribution on a percentage mass basis, of the $ZrB_2$ powder depicted in FIGS. 2 and 3. This powder has a median particle size of about 1.1 microns with over 90 wt% less than 4 microns and less than 10 wt% below 0.3 microns. Practically all (at least 95 wt%) of the powder has a particle size in the range of about 0.2 to 6 microns.

Persons skilled in the art will understand that numerous changes and modifications can be made in my invention without material departure from the spirit and scope of what is set forth in the following claims.

What is claimed is:

1. A process for production of $ZrB_2$ powder, said process comprising the steps of
   (a) providing a molten salt bath comprising $ZrCl_4$ or $ZrCl_2$ and at least one other salt selected from the group consisting of halides of K, Na, Li, Ca and Mg, and mixtures thereof;

(b) maintaining said bath at a temperature above its solidus temperature;

(c) feeding a boron halide and Al or Mg metal to the bath;

(d) reacting the $ZrCl_4$ or $ZrCl_2$ with the boron halide and Al or Mg in the bath to form $ZrB_2$ powder; and (e) separating the $ZrB_2$ powder from the bath.

2. The process of claim 1 wherein said boron halide is $BCl_3$.

3. The process of claim 1 wherein said molten salt bath comprises $ZrCl_4$, KCl and NaCl.

4. The process of claim 1 wherein said molten salt bath is maintained at a temperature of about 540°–660° C. and the metal is fed to the bath in solid form.

5. The process of claim 4 wherein said $ZrB_2$ powder has a median particle size of about 0.7 to 2.0 microns.

6. The process of claim 4 wherein said molten salt bath is maintained at a temperature of about 650° C. and the metal comprises Al.

7. The process of claim 6 wherein said $ZrB_2$ powder has a median particle size of about 1.1 microns.

8. The process of claim 1 further comprising the step of (f) continuously agitating said molten salt bath.

9. The process of claim 1 wherein said $ZrB_2$ powder has a median particle size of about 0.5 to 5 microns.

* * * * *